United States Patent
Kim

(10) Patent No.: US 6,777,128 B2
(45) Date of Patent: Aug. 17, 2004

(54) SECONDARY BATTERY AND FABRICATION METHOD THEREOF

(75) Inventor: Hyun-Joong Kim, Cheonan (KR)

(73) Assignee: Samsung SDI Co., Ltd, Suwon-si (KR)

( * ) Notice: Subject to any disclaimer, the term of this patent is extended or adjusted under 35 U.S.C. 154(b) by 353 days.

(21) Appl. No.: 10/079,532

(22) Filed: Feb. 22, 2002

(65) Prior Publication Data

US 2002/0122974 A1 Sep. 5, 2002

(30) Foreign Application Priority Data

Mar. 5, 2001 (KR) ........................................ 2001-11152

(51) Int. Cl.[7] ................................................ H01M 2/12
(52) U.S. Cl. ............................ 429/54; 429/53; 429/56; 429/174; 429/185; 429/231.95; 29/623.1; 29/623.2; 29/623.4
(58) Field of Search .............................. 429/54, 53, 56, 429/174, 185, 231.95; 29/623.1, 623.2, 623.4

(56) References Cited

U.S. PATENT DOCUMENTS

| 5,376,467 | A | * | 12/1994 | Abe et al. ........................ 429/7 |
| 5,876,868 | A | | 3/1999 | Tanida ........................... 429/56 |
| 5,935,731 | A | | 8/1999 | Nagaura ....................... 429/174 |
| 6,207,320 | B1 | | 3/2001 | Song et al. ................... 429/171 |
| 6,436,573 | B1 | * | 8/2002 | Goto et al. ................... 429/217 |

FOREIGN PATENT DOCUMENTS

KR     P2000-0009696     7/1998

* cited by examiner

Primary Examiner—Hoa Van Le
(74) Attorney, Agent, or Firm—Robert E. Bushnell, Esq.

(57) ABSTRACT

A secondary battery and a fabrication method of the secondary battery includes a battery unit having a positive electrode plate, a negative electrode plate and a separator interposed there between, a can for accommodating the battery unit, and a cap assembly having a cap cover, a safety vent and a gasket, where the end of the safety vent is bent inwards to be filled with the gasket provided along the outer periphery of the safety vent, so that the safety vent is inserted into the gasket in a secure manner.

20 Claims, 4 Drawing Sheets

SECONDARY BATTERY AND FABRICATION METHOD THEREOF

CLAIM OF PRIORITY

This application makes reference to, incorporates the same herein, and claims all benefits accruing under 35 U.S.C. §119 from an application for Secondary Battery and the Fabrication Method Thereof earlier filed in the Korean Industrial Property Office on Mar. 5, 2001 and there duly assigned Serial No. 2001-11152.

BACKGROUND OF THE INVENTION

1. Field of the Invention

The present invention relates to a secondary battery and more particularly a secondary battery having improved safety vent and gasket for attaining securely sealed battery, and a fabrication method thereof.

2. Description of the Related Art

Lithium batteries are capable of charging and discharging and are classified into nickel-cadmium (Ni—Cd) batteries, nickel-hydride (Ni—MH) batteries, and lithium secondary batteries. Specifically, the lithium secondary batteries are rapidly developing in view of their excellent energy density per unit weight compared to the nickel-cadmium (Ni—Cd) batteries or nickel-hydride (Ni—MH) batteries. The lithium secondary batteries can be classified into liquid electrolyte batteries and solid electrolyte batteries according to the electrolyte used. In general, batteries using liquid electrolyte are referred to as lithium-ion batteries and batteries using polymeric electrolyte are referred to as lithium polymer batteries.

A conventional lithium secondary batteries includes a battery unit mounted inside a can. The battery unit has a positive electrode plate and a negative electrode plate with a separator disposed therebetween.

A cap assembly is connected to the upper portion of the battery unit. The cap assembly includes a cap cover, a current controller, a safety vent and a cap plate interposed by means of an insulating member, sequentially stacked. The cap assembly has a gasket installed at its outer periphery to be insulated from the can.

Here, the positive electrode tap is drawn from the positive electrode plate through an insulation plate and its ends are welded to the cap plate. The cap plate contacts the safety vent having a concave portion where explosion occurs first due to formation of a notch.

The battery is constructed such that the above-described parts are sequentially stacked and then a portion between the safety vent and the gasket is forcibly crimped to obtain a sealed space so as to prevent leakage of electrolytic solution.

The conventional battery encounters with the following problems.

First, the positive electrode tap has its end welded by laser welding or ultrasonic welding at the bottom surface of the central portion of the cap plate to be electrically connected with the end of the cap plate. In the event of abnormal welding, heat is transferred to the safety vent to produce voids, by which a perfectly sealed space cannot be established, degrading the reliability of the battery.

Second, the gasket installed along the outer periphery of the safety vent, has ends bent toward its inner part. Crimping is made in a state in which the bent outer periphery is secured on an inner circumference of the gasket.

In the course of performing the above-described processes, a gap may be created due to adhesion inferiority during the crimping between the outer periphery of the safety vent and the inner circumference of the gasket. Accordingly, an organic electrolyte may leak through the gap, due to an increased internal pressure of the battery leading to imperfect sealing of the battery.

Therefore, it is necessary to attain safety of the battery by timely explosion of the concave portion of the safety vent so that gas generated by the increased internal pressure due to abnormal operation of the battery can be exhausted. However, if a perfectly sealed space is not provided due to generation of voids or gap, the concave portion cannot be ruptured at an appropriate pressure. As a result, the battery may be exploded due to rapidly increasing internal pressure due to instantaneous exothermic reaction occurring inside the battery.

SUMMARY OF THE INVENTION

It is therefore an object of the present invention to provide a secondary battery having an improved connection structure of a safety vent and a gasket in order to attain perfectly sealed space in the battery, and a fabrication method thereof.

It is another object of the present invention to provide a secondary battery having an improved structure at a fixing portion of a positive electrode tap and a cap plate.

It is yet another object to increase the production efficiency of making a secondary battery by reducing the number of fabrication processes.

It is still yet another object to reduce the thickness of portions of a secondary battery.

To accomplish the above and other objects, there is a secondary battery including a battery unit having a positive electrode plate, a negative electrode plate and a separator interposed there between, a can for accommodating the battery unit, and a cap assembly connected to the upper portion of the can and having a cap cover, a safety vent installed in the lower portion of the cap cover and being ruptured at a predetermined internal pressure of the battery, and a gasket provided along the periphery of the safety vent, where the end of the safety vent is bent inwards to be filled with the gasket provided along the outer periphery of the safety vent, so that the safety vent is fixedly inserted into the gasket.

The safety vent is preferably bent inwards from the periphery of a base having a notch and the outer periphery of the end is positioned on the inner circumference of the gasket.

Also, the gasket preferably wraps upper and lower surfaces of the end by a connecting portion integrally extending from the bottom surface of the gasket, to form an alternately stacked structure.

Further, the safety vent preferably has an extension tap drawn from its end, the extension tap being connected to the positive electrode tap connected to the positive electrode plate.

Preferably, the extension tap is positioned at the periphery of the can to be welded to the positive electrode tap.

Also, the extension tap is preferably integrally formed with the end.

According to another aspect of the present invention, there is provided a method of fabricating a secondary battery including a battery unit, a can for accommodating the battery unit, and a cap assembly having a cap cover, a safety vent and a gasket sequentially positioned on the can, the method including the steps of bending an end of the safety vent ruptured at a predetermined internal pressure of the battery toward the center of the safety vent, injecting a raw material of the gasket into the outer periphery of the safety vent to fill upper and lower surfaces of the bent portion so that the gasket is integrally fixed to the safety vent, and compressing the safety vent, the gasket and the can.

Alternatively, the present invention provides a method of fabricating a secondary battery including a battery unit, a can for accommodating the battery unit, and a cap assembly having a cap cover, a safety vent and a gasket sequentially positioned on the can, the method including the steps of forming an end of the safety vent ruptured at a predetermined internal pressure of the battery in a state in which the safety vent is allowed to stand upright, injecting a raw material of the gasket into the outer periphery of the safety vent to wrap the end, bending the end of the safety vent filled with the gasket so that the gasket is integrally fixed to the safety vent, and compressing the safety vent, the gasket and the can.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
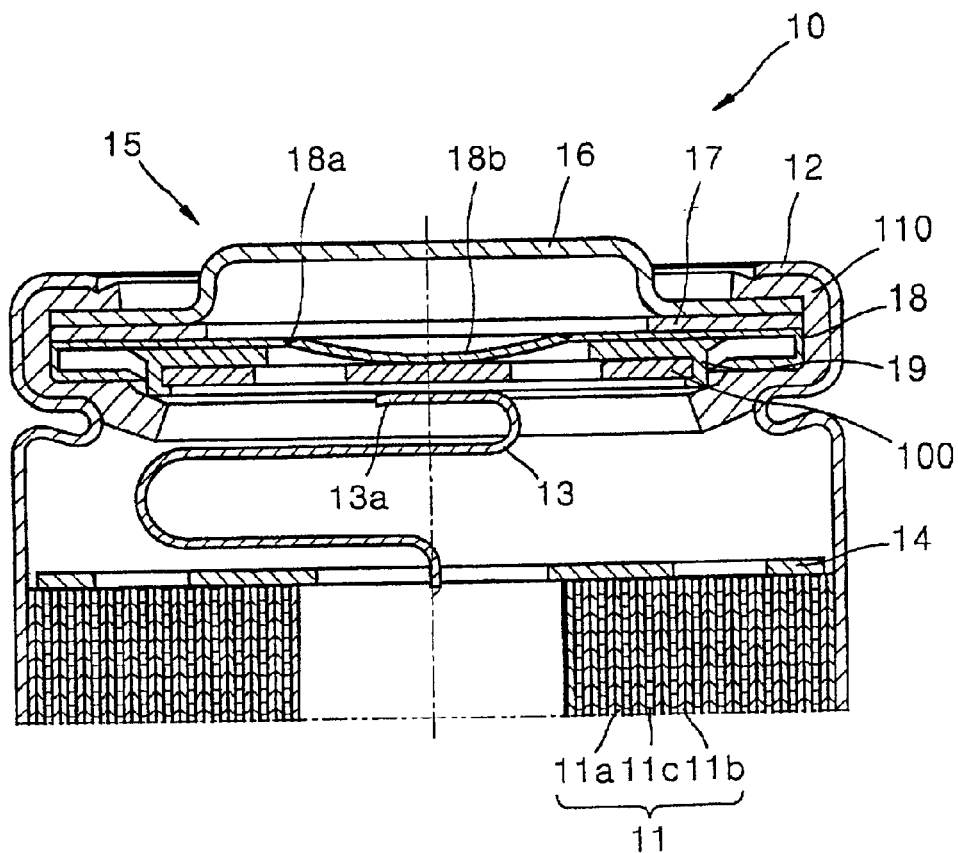
FIG. 1 is a partly extracted cross-sectional view of a conventional secondary battery.

FIG. 1 shows a cylindrical battery 10, which is one of the conventional lithium secondary batteries. Referring to FIG. 1, the battery 10 includes a battery unit 11 mounted inside a can 12. The battery unit 11 has a positive electrode plate 11a and a negative electrode plate 11b with a separator 11c disposed there between.

A cap assembly 15 is connected to the upper portion of the battery unit 11. The cap assembly 15 includes a cap cover 16, a current controller 17, a safety vent 18 and a cap plate 100 interposed by means of an insulating member 19, sequentially stacked. The cap assembly 15 has a gasket 110 installed at its outer periphery to be insulated from the can 12.

Here, the positive electrode tap 13 is drawn from the positive electrode plate 11a through an insulation plate 14 and its ends are welded to the cap plate 100. The cap plate 100 contacts the safety vent 18 having a concave portion 18b where explosion occurs first due to formation of a notch 18a.

The battery 10 is constructed such that the above-described parts are sequentially stacked and then a portion between the safety vent 18 and the gasket 110 is forcibly crimped to obtain a sealed space so as to prevent leakage of electrolytic solution.

The conventional battery 10 encounters with the following problems.

First, the positive electrode tap 13 has its end 13a welded by laser welding or ultrasonic welding at the bottom surface of the central portion of the cap plate 100 to be electrically connected with the end 13a of the cap plate 100. In the event of abnormal welding, heat is transferred to the safety vent 18 to produce voids, by which a perfectly sealed space cannot be established, degrading the reliability of the battery 10.

Figure 2:
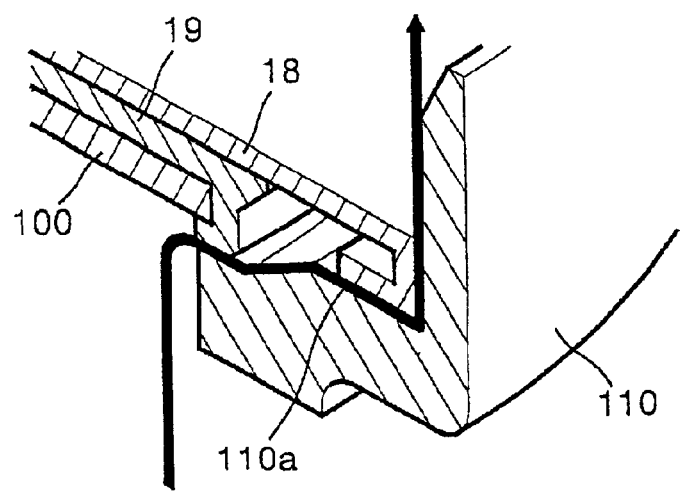
FIG. 2 is an enlarged cross-sectional view showing important parts shown in FIG. 1.

Second, as shown in FIG. 2, the gasket 110 installed along the outer periphery of the safety vent 18, which has ends bent toward its inner part. Crimping is made in a state in which the bent outer periphery is secured on an inner circumference 110a of the gasket 110.

In the course of performing the above-described processes, a gap may be created due to adhesion inferiority during the crimping between the outer periphery of the safety vent 18 and the inner circumference 110a of the gasket 110. Accordingly, an organic electrolyte may leak through the gap, as indicated by an arrow shown in FIG. 2, due to an increased internal pressure of the battery 10, leading to imperfect sealing of the battery 10.

Therefore, it is necessary to attain safety of the battery 10 by timely explosion of the concave portion 18b of the safety vent 18 so that gas generated by the increased internal pressure due to abnormal operation of the battery 10 can be exhausted. However, if a perfectly sealed space is not provided due to generation of voids or gap, the concave portion 18b cannot be ruptured at an appropriate pressure. As a result, the battery 10 may be exploded due to rapidly increasing internal pressure due to instantaneous exothermic reaction occurring inside the battery 10.

Figure 3:
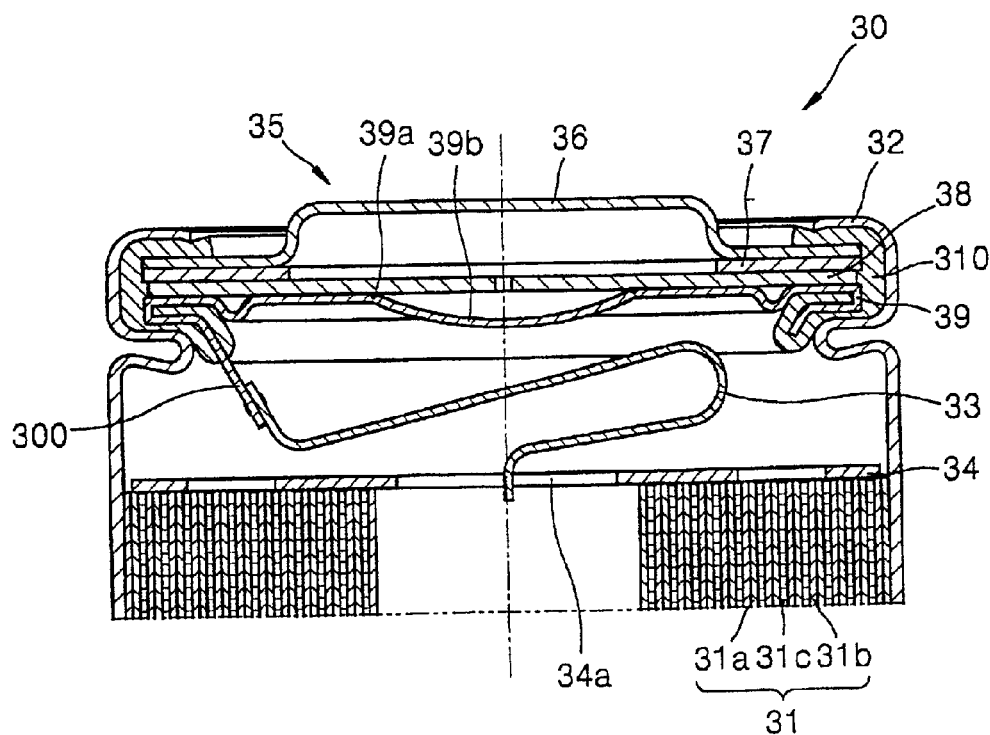
FIG. 3 is a partly extracted cross-sectional view of a secondary battery according to the present invention.

FIG. 3 is a partly extracted cross-sectional view of a secondary battery according to a first embodiment of the second invention, that is, a cylindrical battery 30.

Referring to FIG. 3, the battery 30 includes a can 32 and a cap assembly 35 connected to an upper portion of the can 32.

A battery unit 31 is installed inside the can 32. The battery unit 31 has a positive electrode plate 31a, a negative electrode plate 31b and a separator 31c interposed there between for isolation, wound in a jelly-roll type. A positive electrode tap 33 is drawn from the positive electrode plate 31a and a negative electrode tap (not shown) is drawn from the negative electrode plate 31b. The negative electrode tap is welded to the can 32. An insulating member 34 having a through hole 34a from which the positive electrode tap 33 is drawn, is installed in the upper portion of the battery unit 31.

A cap assembly 35 is positioned in the upper portion of the can 32 and includes a cap cover 36 serving as a positive electrode terminal. A first current controller 37 is a resistor in which its zero-power resistance increases according to an increase in temperature, and is preferably made of a positive temperature coefficient material, which is a mixture of paste-like polymer, and carbon material.

A second current controller 38, e.g., a current brake made of conductive epoxy resin, is installed in the lower portion of the first current controller 37 in order to securely prevent the flow of current in the event of abnormality of the battery 30.

A safety vent 39, that ruptures at a predetermined pressure, is installed in the lower portion of the second current controller 38 in order to prevent danger of an explosion by exhausting gas generated due to abnormality of the battery 30 such as shorting, impact deformation or overcharging.

A notch 39a is formed in the safety vent 39 in order to facilitate explosion, and a concave portion 39b is formed inwards with respect to the notch 39a so that the explosion occurs thereat first. An extension tap 300 having a predetermined length is formed at the periphery of the safety vent 39. The extension tap 300 is welded to the positive electrode tap 33.

A gasket 310 is provided at the periphery of the cap assembly 35 to be electrically isolated from the can 32.

According to the feature of the present invention, the positive electrode tap 33 is not electrically connected to the cap cover 36 by being in contact with a conductive means at the center of the battery 30, but is welded to the extension tap 300 drawn from the safety vent 39 at the periphery of the can 32. Also, the safety vent 39 has a stacked structure such that the gasket 310 is partly interposed between upper and lower parts of the bent periphery of the safety vent 39, thereby attaining a perfectly sealed space. This will later be described in more detail through the following embodiments.

Figure 4:
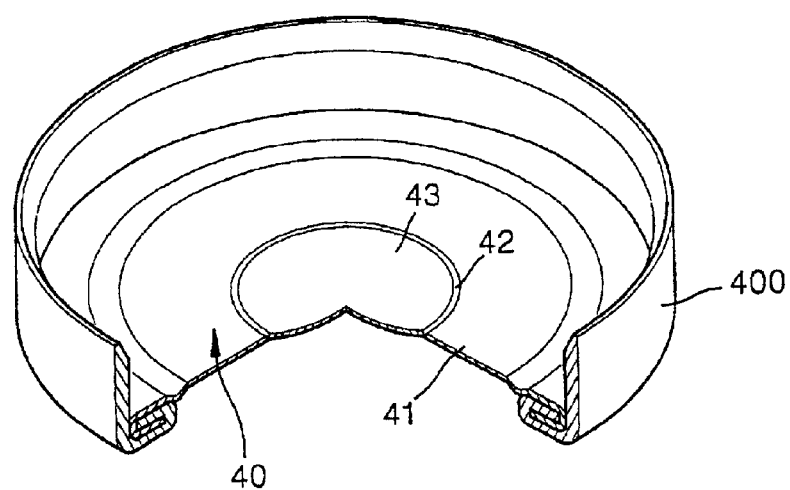
FIG. 4 is a partly extracted perspective view showing the connection structure of a safety vent and a gasket in a secondary battery according to a first embodiment of the present invention.
Figure 5:
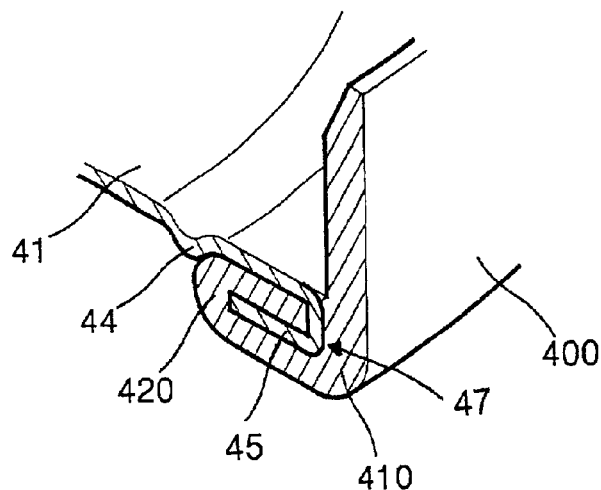
FIG. 5 is an enlarged cross-sectional view showing important parts shown in FIG. 4.

FIG. 4 is a partly extracted perspective view showing the connection structure of a safety vent 40 and a gasket 400 in a secondary battery according to a first embodiment of the present invention and FIG. 5 is an enlarged cross-sectional view showing important parts shown in FIG. 4. Referring to the drawings, the safety vent 40 is made of a metallic foil and is substantially shaped of a disk. The safety vent 40 includes a base 41 and a notch 42 formed inside the base 41 in an annular shape. The notch 42 is depressed inward so that a concave portion 43, which is an area where the explosion takes place first, is formed at the center thereof. A recess 44 is formed along the periphery of the base 41, and an end 45 bent inwards is formed at the outer periphery from the recess 44 so as to have a substantially sideways "U" shaped cross-section.

The gasket 400 made of polymeric resin is installed at the external side of the safety vent 40. The gasket 400 is configured such that the safety vent 40 is positioned on its bottom surface 410 and is a cup-shaped insulator having a cavity in the center thereof. The gasket 400 has a connecting portion 420 integrally extending inwards from the bottom surface 410. The connecting portion 420 wraps the upper and lower surfaces of the bent portion 47 so as to cover an end 45 of the safety vent 40.

The safety vent 40 and the gasket 400 are connected by the following manners.

First, the end 45 of the safety vent 40 is bent in the above-described shape during forming. Then, the gasket 400 is injected into the outer periphery of the safety vent 40 so as to be connected to each other.

Here, a space between the upper and lower surfaces of the bent end 45 of the safety vent 40 is filled with the connecting portion 420 made of polymer resin, so that the gasket 400 is securely connected to the safety vent 40. In other words, the end 45 and the connecting portion 420 are vertically stacked, rather than being contacted by surface, thereby attaining perfectly secured sealed space.

Alternatively, during forming of the safety vent 40, the end 45 is not bent but is allowed to stand upright. Then, the gasket 400 is injected into the outer periphery of the safety vent 40 so as to be connected to each other. Thereafter, the end 45 is bent inwards during forming. Accordingly, the end 45 and the connecting portion 420 are connected to each other in a stack type.

Figure 6:
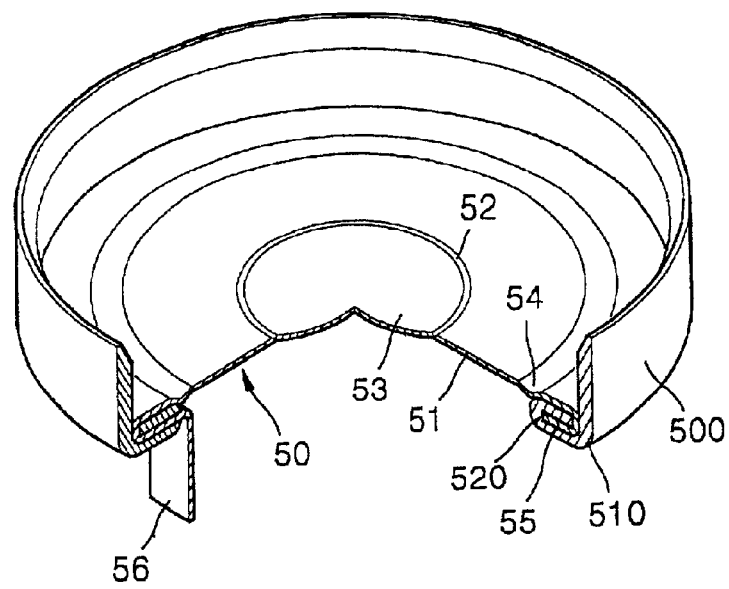
FIG. 6 is a partly extracted cross-sectional view of a secondary battery according to a second embodiment of the second invention.

FIG. 6 shows the connection structure of a safety vent 50 and a gasket 500 in a secondary battery according to a second embodiment of the present invention.

Referring to FIG. 6, the safety vent 50 includes a base 51, a notch 52 formed inside the base 51, a concave portion 53 having a deepest point at the center of the notch 52, a recess 54 formed at the periphery of the base 51 and an end 55 bent from the recess 54. The end 55 has a substantially sideways "U" shaped cross-section.

The gasket 500 is installed on the outer peripheral surface of the safety vent 50. The gasket 500 completely wraps the outer peripheral surface of the safety vent 50 by injection-molding. Here, the end 55 of the safety vent 50 is bent in the above-described shape, and a space between the upper and lower surfaces of the end 55 is filled with the connecting portion 520 integrally extending inwards from the bottom surface 510 of the gasket 500, so that the connection between the safety vent 50 and the gasket 500 is secured, thereby attaining a perfectly sealed space.

Here, an extension tap 56 is formed at one side of the safety vent 50. In other words, the extension tap 56 extending downwards from the end 55 is integrally formed, or is connected to the end 55 by a separate process.

Figure 7:
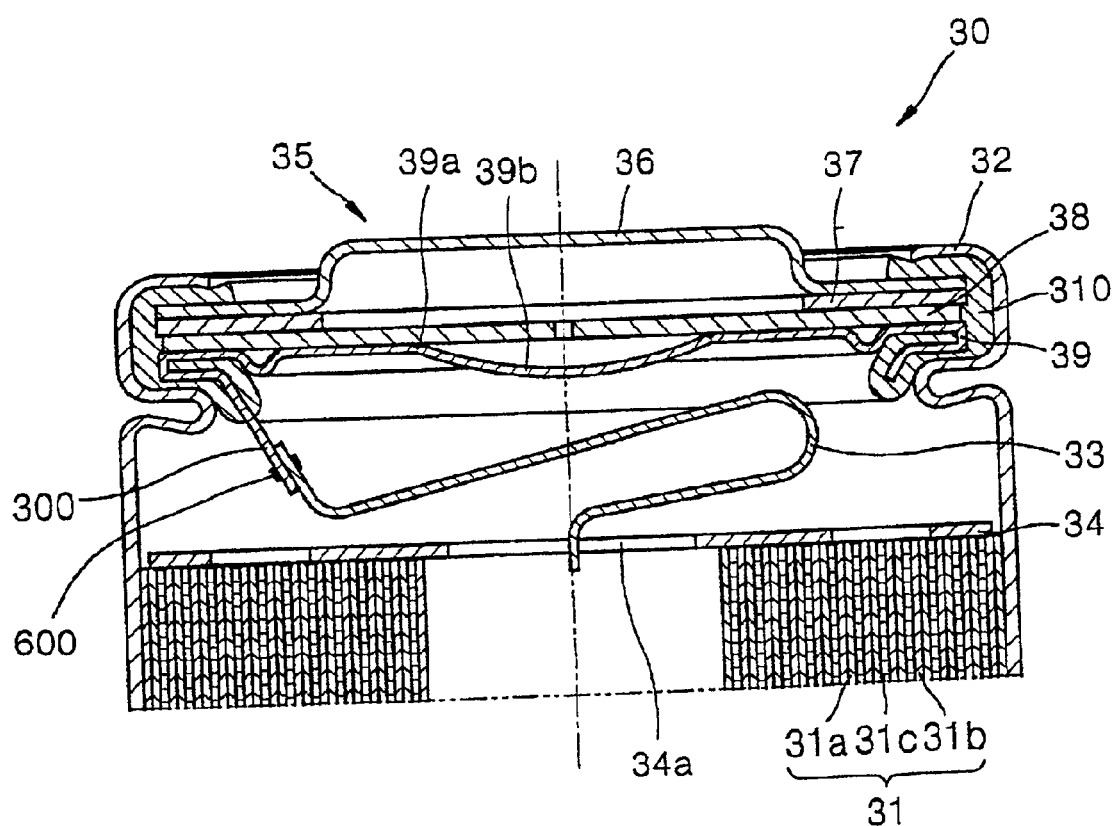
FIG. 7 is a partly extracted cross-sectional view of a secondary battery according to the present invention.

The extension tap 56 is positioned at the periphery inside the battery (30 of FIG. 3). Also, the extension tap 56 is welded to the positive electrode tap 33 by laser welding or ultrasonic welding during battery fabrication. Various welding methods may be used to weld the extension tap 300 and the positive electrode tap 33 or the negative electrode tap. The welding methods include for example ultrasonic welding, resistance welding and preferably laser welding. In addition to welding, other connection methods, such as riveting, may be employed. FIG. 7 is the same as FIG. 3 except that a rivet 600 is used as the connection method.

As described above, the extension tap 56 is adhered to the positive electrode tap 33 at the periphery of the battery (30 of FIG. 3) in order to prevent leakage of a sealed space, which may occur at the center of the battery 30 during welding, e.g., leakage through voids formed in the safety vent 50.

The aforementioned connection structure of the battery 30 according to the present invention will now be summarized with reference to FIG. 3.

In a state in which the end of the safety vent 39 is bent, the gasket 310 is insert-molded to acquire a sealed space. The extension tap 300 extending from the end of the safety vent 39 is welded to the positive electrode tap 33 at an area sufficiently spaced apart from the sealed portion by laser welding. After acquiring the sealed space by connecting the safety vent 39 and the gasket 310, the can 32, the safety vent 39 and the gasket 310 are crimped for compression.

As described above, in the secondary battery and fabrication method thereof according to the present invention, the end of a safety vent is bent in a predetermined shape and a gasket is partially injected into a space formed by upper and lower surfaces of the bent portion to form a stacked structure, thereby achieving secured connection, producing a perfectly sealed space. Also, an extension tap drawn from the end of the safety vent is connected to a positive electrode tap at an area sufficiently spaced apart from a portion where the sealed space is formed. Thus, according to the present invention, the following advantages can be achieved.

First, since the gasket wraps the exterior of the safety vent to be connected to each other in a state in which the end of the safety vent is bent, a perfectly sealed space inside a battery can be attained.

Second, since the welded portion of an extension tap drawn from the safety vent and a positive electrode tap is spaced apart from a sealed portion of the battery, safety of the battery can be ensured even in abnormal welding.

Third, the extension tap extending from the safety vent and the positive electrode tap can be electrically connected by various connection methods, e.g., riveting, other than welding.

Fourth, since the safety vent and the gasket are integrally formed, the number of fabrication processes can be reduced, thereby improving the production efficiency.

Fifth, since a perfectly sealed battery structure can be ensured, gas generated by an increase in internal pressure of the battery due to abnormality of the battery, can be exhausted, so that a weak part of the safety vent can be ruptured at an appropriate pressure thereby preventing explosion.

Sixth, since the air-tightness of the battery is enhanced, the thickness of a can is greatly reduced, so that the can is made into a thin film.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A secondary battery, comprising:
   a battery unit having a positive electrode plate, a negative electrode plate and a separator interposed between said positive electrode plate and said negative electrode plate;
   a can for accommodating said battery unit; and
   a cap assembly connected to the upper portion of said can, said cap assembly comprising:
   a cap cover;
   a safety vent installed in the lower portion of said cap cover and capable of being ruptured at a predetermined internal pressure of said secondary battery; and
   a gasket provided along the periphery of said safety vent,
   wherein the end of said safety vent is bent inwards to be filled with said gasket provided along the outer periphery of said safety vent, accommodating said safety vent being securely inserted into said gasket.

2. The secondary battery of claim 1, wherein said safety vent is bent inwards from the periphery of a base including a notch and the outer periphery of the end is positioned on the inner circumference of said gasket.

3. The secondary battery of claim 2, wherein said gasket wraps upper and lower surfaces of the end by a connecting portion integrally extending from the bottom surface of said gasket, to form an alternately stacked structure.

4. The secondary battery of claim 2, wherein said safety vent includes an extension tap drawn from an end of said safety vent, said extension tap being connected to any one of said positive electrode tap and negative electrode tap connected to a respective one of said positive electrode plate and negative electrode plate.

5. The secondary battery of claim 4, wherein said extension tap is positioned at the periphery of said can to be welded to any one of said positive electrode tap and negative electrode tap.

6. The secondary battery of claim 4, wherein said extension tap is positioned at the periphery of said can to be laser welded to any one of said positive electrode tap and negative electrode tap.

7. The secondary battery of claim 4, wherein said extension tap is positioned at the periphery of said can to be riveted to any one of said positive electrode tap and negative electrode tap.

8. The secondary battery of claim 4, wherein said extension tap is integrally formed with the end of said safety vent.

9. The secondary battery of claim 1, wherein said safety vent being integrally formed with said gasket.

10. The secondary battery of claim 1, wherein said gasket completely wraps the bent outer surface of said safety vent by injection molding to form a sealed portion, an extension tap extends from an end of said safety vent and coupled to an area of an electrode tap of said electrode, the area being spaced apart from the sealed portion of said gasket and said safety vent.

11. The secondary battery of claim 10, wherein said safety vent is integrally connected with said gasket.

12. A method of fabricating a secondary battery comprising a battery unit including a positive electrode plate, a negative electrode plate and a separator interposed between said positive electrode plate and said negative electrode plate, a can for accommodating said battery unit, and a cap assembly connected to the upper portion of said can, said cap assembly comprising a cap cover, a safety vent installed in the lower portion of said cap cover and capable of being ruptured at a predetermined internal pressure of said secondary battery and a gasket provided along the periphery of said safety vent, with the end of said safety vent being bent inwards to be filled with said gasket provided along the outer periphery of said safety vent, accommodating said safety vent being securely inserted into said gasket, the method comprising the steps of:
   bending an end of said safety vent toward the center of said safety vent, said safety vent capable of being ruptured at a predetermined internal pressure of said secondary battery;
   injecting a raw material of said gasket into the outer periphery of said safety vent to fill upper and lower surfaces of the bent portion to accommodate the gasket being integrally secured to said safety vent; and
   compressing said safety vent, said gasket and said can.

13. The method of claim 12, further comprising the step of integrally forming an extension tap with the end of said safety vent, said extension tap being coupled to a first electrode tap, said first electrode tap being drawn from a first electrode plate.

14. The method of claim 12, further comprising the step of coupling an extension tap with the end of said safety vent.

15. A method of fabricating a secondary battery comprising a battery unit including a positive electrode plate, a negative electrode plate and a separator interposed between said positive electrode plate and said negative electrode plate, a can for accommodating said battery unit, and a cap assembly connected to the upper portion of said can, said cap assembly comprising a cap cover, a safety vent installed in the lower portion of said cap cover and capable of being ruptured at a predetermined internal pressure of said secondary battery and a gasket provided along the periphery of said safety vent, with the end of said safety vent being bent inwards to be filled with said gasket provided along the outer periphery of said safety vent, accommodating said safety vent being securely inserted into said gasket, the method comprising the steps of:

forming an end of said safety vent in a state where said safety vent is allowed to stand upright, said safety vent capable of being ruptured at a predetermined internal pressure of said secondary battery;

injecting a raw material of said gasket into the outer periphery of said safety vent to wrap the end;

bending the end of said safety vent filled with the gasket to accommodate the gasket being integrally secured to the safety vent; and compressing said safety vent, said gasket and said can.

16. The method of claim 15, further comprising the step of integrally forming an extension tap with the end of said safety vent, said extension tap being coupled to a first electrode tap, said first electrode tap being drawn from a first electrode plate.

17. The method of claim 15, further comprising the step of coupling an extension tap with the end of said safety vent.

18. The method of claim 17, further comprising the step of adhering said extension tap to a first electrode tap.

19. A method of fabricating the secondary battery of claim 1, the method comprising the steps of:

bending an end of said safety vent toward the center of said safety vent, said safety vent capable of being ruptured at a predetermined internal pressure of said secondary battery;

injecting a raw material of said gasket into the outer periphery of said safety vent to fill upper and lower surfaces of the bent portion to accommodate the gasket being integrally secured to said safety vent; and compressing said safety vent, said gasket and said can.

20. A method of fabricating the secondary battery of claim 1, the method comprising the steps of:

forming an end of said safety vent in a state where said safety vent is allowed to stand upright, said safety vent capable of being ruptured at a predetermined internal pressure of said secondary battery;

injecting a raw material of said gasket into the outer periphery of said safety vent to wrap the end;

bending the end of said safety vent filled with the gasket to accommodate the gasket being integrally secured to the safety vent; and compressing said safety vent, said gasket and said can.

* * * * *